Aug. 19, 1958 — M. A. MOSKOVITZ — 2,848,260
REPLACEABLE BALL-JOINT UNIT
Filed April 29, 1957
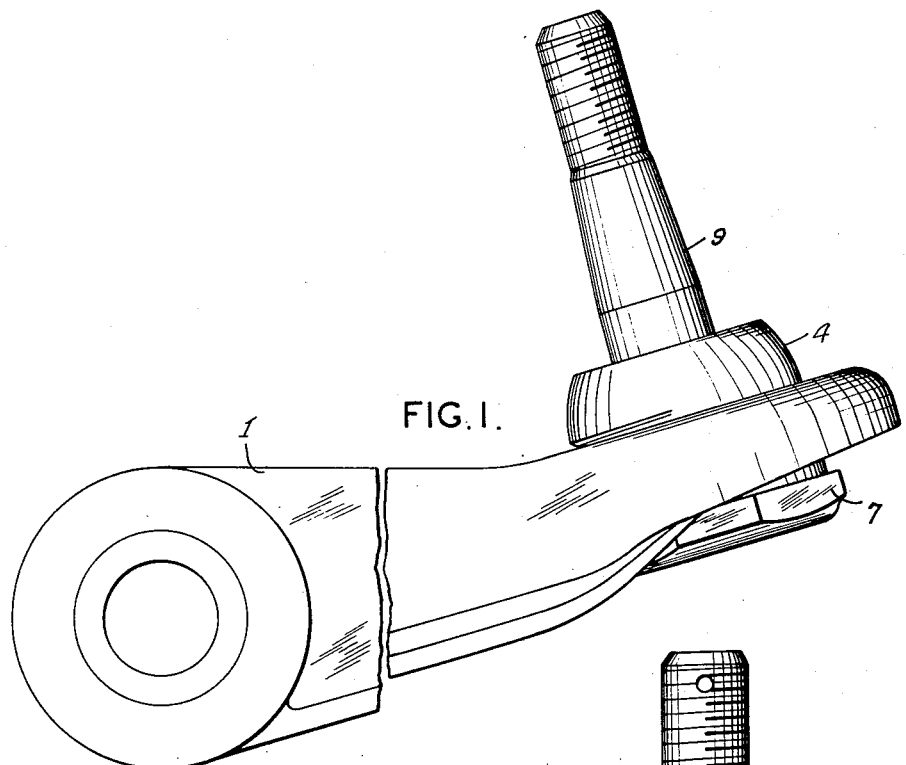
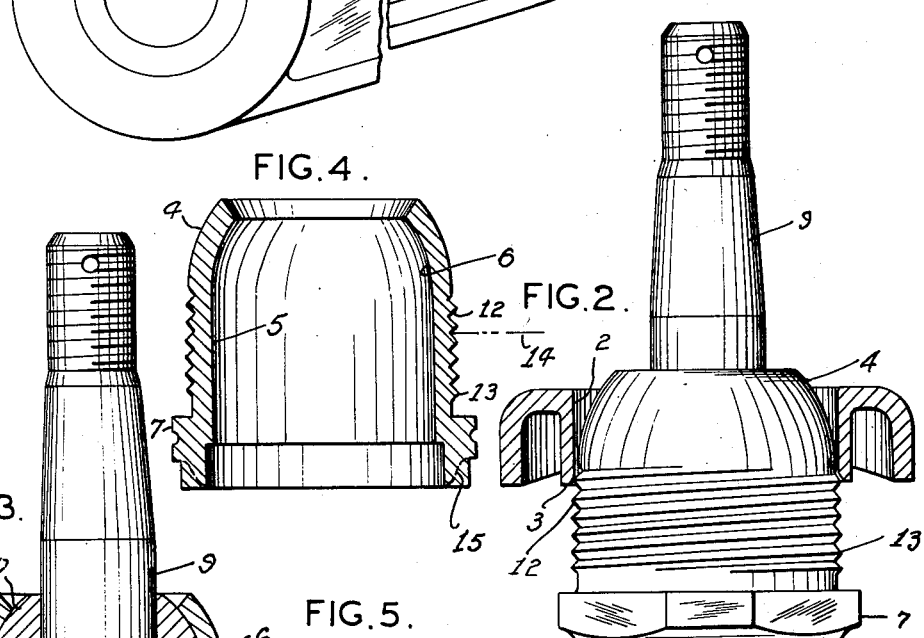
INVENTOR
MILTON A. MOSKOVITZ
BY: Ben V. Zillman
ATTORNEY United States Patent Office 2,848,260
Patented Aug. 19, 1958

2,848,260

REPLACEABLE BALL-JOINT UNIT

Milton A. Moskovitz, Richmond Heights, Mo., assignor of one-half to Harry Frankel, St. Louis, Mo.

Application April 29, 1957, Serial No. 655,756

8 Claims. (Cl. 287—90)

This invention relates to ball joints generally, and more specifically to a ball joint that is self-contained as a complete unit ready for installation and replacement in a suitable co-operating member, as needed.

The invention has among its general objects the production of such a joint unit that is adapted to be mounted through an eye of a co-operating member, rapidly and with positive securement to the latter, well able to withstand those forces and stresses that it must encounter in use, economical to make and install with great accuracy, and which is otherwise safe, satisfactory and efficient for use wherever deemed applicable.

One of the principal objects of my invention is to so construct the casing or housing of said joint unit that it will have external threads thereon, said threads being of such character that their lead or starter portion is sufficiently hard to readily cut complementary threads into the eye wall, while their follower portion is sufficiently softer than said lead threads to be able to withstand the stresses and strains to which said casing will be subjected to in use and without danger of stripping said threads.

Another object of the invention is to so construct said casing that it will have a concave bearing surface therein for bearing engagement with a co-operating stud assembly intended to rotate and tilt relatively therein, said concave bearing surface too, being of approximately the same degree of hardness as that of said lead threads, to thereby provide an extremely smooth and long-wearing bearing surface to engage said stud assembly.

A further object of my invention is to so manufacture said casing that it will first be casehardened over its entire exposed surface, and then so treat a predetermined portion of said casing to soften it sufficiently to ably withstand a cold-worked rolling or peening action after cutting away part of said softened carburized portion.

Many other objects and advantages of the construction herein shown and described and the method of making the same, will be obvious to those skilled in the art to which this invention apertains, as will be more clearly apparent from the disclosures herein given.

To this end, my invention consists in the novel construction, arrangement, combination and form of parts herein shown and described, and the method employed, all as will be clearly pointed out in the specification and claims.

In the drawings, wherein like reference characters represent like or corresponding parts throughout the views, Figure 1 is a side elevation of a control arm, showing the joint unit operably mounted in an eye of said arm;

Figure 2 is a cross-sectional detail showing the insertion of said joint unit prior to self-threading it into place in said eye;

Figure 3 is a cross-sectional view of the joint as it appears ready for installation in said eye;

Figure 4 is a cross-sectional view of the casing before a portion of its radially larger end is cut away to form the peenable flange; and Figure 5 is a cross-sectional detail of said casing fragment after forming said peenable flange.

Referring more particularly to the drawing, wherein I have illustrated a preferred embodiment of my invention, 1 represents a control arm of a motor-vehicle construction and which is generally pivoted at one end to a cross-frame member of the vehicle, and the other end of said arm is adapted to be connected through a ball-joint unit to a co-operating, relatively movable member such as to the spindle of one of the dirigible front wheels (not shown) of the vehicle, it being obvious that the control arm may be either the load-carrying arm or the nonload-carrying arm. In this instance, the joint unit is intended for connection to the load-carrying control arm; hence, is not spring-loaded.

The arm has an eye 2 provided therethrough and the circumferentially encircling or bounding wall of said eye is initially smooth and unthreaded as seen in Fig. 2, and one end of said eye terminates in an annular end face 3 intended to provide an abutment stop for limiting insertion movement of said joint unit within said eye.

The casing, housing, shell or cartridge of said joint unit is reduced diametrally at one end as at 4, herein indicated as being at the lower end, and said casing is axially bored entirely therethrough to provide an interior chamber 5. Said chamber, adjacent said reduced-diameter end, is provided with a concave or partially spherical bearing surface 6, and the upper end of said casing is provided with a flange 7 projecting radially outwardly therefrom.

The head end 8 of a stud is positioned within said chamber, the shank 9 of said stud projecting axially outwardly through said diametrally reduced end of the casing.

A bushing 10 of suitable material, is interposed between said stud and concave bearing surface and has a convex, partially spherical exterior bearing face that is substantially complemental to the surface 6 so that when all of said parts are in their assembled relation as indicated in Fig. 3, said stud may rotate relatively of said bushing and casing, and may tilt with said bushing, about said concave bearing surface.

An end closure 11 may be fixedly secured to said casing to bridge across the top of said casing bore to sealingly hold all of said joint-unit parts in their intended assembled relation, as by peening, preferably in a cold-working operation, the end of the casing over the peripherally bounding edge of said closure, and a more detailed explanation of the formation of said peenable portion of the casing will soon be given.

The joint unit shown in the drawings is intended to be insertible between the load-carrying control arm and a dirigible front wheel spindle of the motor vehicle, but in the event that the joint will not be used to support the load, suitable means may be interposed in the casing between said stud head and end closure to yieldably constantly urge said stud axially against said bushing.

In order to obviate the need for extraneous or interlocking fastening means for holding the unit to its supporting member, the exterior of the annular side wall of said casing is screw-threaded, the full length of such threading being of constant pitch, these threads being grouped into starter or lead threads 12 that are adjacent the small diameter end of the casing, and follower threads 13 immediately rearwardly of said starter threads, the plane of demarcation 14 between said groups of threads being located at about the rearmost or longitudinally innermost limit of the concave bearing surface 6.

In the design and manufacture of such ball joints it is recognized that the achieving of certain basic requirements for the proper functioning of the unit creates some unfavorable conditions relating to other functional requirements. For example, it is a basic need that the concave bearing surface 6 be smooth and relatively hard, say to a Rockwell C 60-63, roughly, in order to provide adequate wear resistance against frictional movement of the bushing. This kind of a wear surface may be had by casehardening the same. From experimentation, it has been found that an effective case depth of approximately .020" will provide proper functioning and give a reasonable life expectancy to the unit. Similar experimentation has proved that a lesser or a superficial case depth, to the order of about .005" is inadequate to attain the desired quality of wear-resistance.

It is also known that a casehardened surface must be backed up with a substantially relatively ductile supporting-core thickness or body in order to secure proper strength for said part, inasmuch as the cased surface is relatively brittle; i. e., the greater the hardness the greater the degree of brittleness.

Further and also found through experimentation, a carburized casehardened section cannot be successfully spun or peened, and even with carburization alone, such section will not lend itself to good peening quality by either a "cold-working" or a "hot-working" of the metal. Therefore, it is necessary that the peening-tool-engageable portion of the casing be substantially free of carburization in order to permit of successful working engagement by the peening tool.

In order to avoid the aforesaid objections, the housing or casing is preferably made as follows:

The cartridge, shell, casing or housing is first fashioned by any suitable process, as on an automatic screw machine, power press or the like, to the shape shown in Fig. 4, preferably of a suitable grade of carburizing steel, such as C-1117, C-1010, etc. It is initially shaped so that there is sufficient core thickness of metal at the larger end of the casing to permit of a subsequent thinning of metal thereat, as by a cutting tool, to form a peenable annular rearwardly extending flange 15.

The entire surface of the casing is now carburized in any suitable process while heating said exposed areas, and then the casing is ready for casehardening. This is done in a suitable manner, as by quenching the hot carburized piece in liquid, preferably to approximately .020" case thickness or depth so as to result in a Rockwell hardness of about C-60 to C-63.

In such a state of hardness, the concave bearing surface 6 possesses proper wear requirement, but because all of the threads have now been carburized substantially through their full height or thickness, they would be so brittle as to make them practically useless to take the heavy stresses and strains to which they would be subjected in service. Further, at such a hardness it would be impractical to peen the larger end of the casing with a cold-working operation.

In order to cure said defects and to make the casing really serviceable, further steps must be performed on the piece. A predetermined length of casing, measured axially, is now annealed so as to soften the same relatively of the remaining length of casing, and this operation is performed by applying heat, as with an electric induction coil, or by a flame. The coil is placed so as to surround the enlarged rear end of the casing, using sufficient voltage to bring the temperature thereat to slightly over the upper critical temperature of the specific metal being worked on and taking into consideration the penetration of carbon present, and this is best done by a preliminary experimentation before making an actual production run.

The heat travels through the casing from its area of application toward the opposite end of the casing to thus progressively dissipate as it travels in said direction. In order to insure that the concave bearing surface and the exterior of the casing side wall adjacent said bearing surface (and which in this instance includes said starter threads) retains substantially all of their casehardness, said casing may be immersed in flowing water, oil, etc., to approximately said line of demarcation 14 while applying said heat. In this way the rearmost or uppermost end of the casing is made relatively softer than the rest of the casing and which permits of the next operation, namely, of cutting off a corner and end face of said larger end of the casing (as indicated in dotted lines in Fig. 4) to thereby remove carburized area therefrom and leave the relatively thin flange 15 that permits of successfully cold-working a peening tool thereagainst without splitting of the metal, and thereby spin said flange radially inwardly onto the closure disk 11 that is held in position as indicated.

The lead threads and bearing surface 6 have not been heated sufficiently in the annealing operation to materially affect their hardness, but the follower threads have been sufficiently softened and have acquired more ductility as compared to the starter threads, to give them strength and toughness to withstand and resist thread-stripping under loads.

Inasmuch as certain internal stresses and strains may have been set up in the metal during the aforesaid operations, it is preferred that before use, the casing be tempered, as by being heated to a temperature throughout that is below the critical temperature of the metal concerned, to thereby relieve the metal and to further improve the ductility of the annealed portions of the casing. This does not appreciably alter the external hardness characteristic of the previously casehardened lower-end portions of the casing.

The starter or lead threads are now sufficiently hard to cut complemental threads in the enclosing or bounding wall of the eye 2 as said casing is rotably driven through said eye, and the follower threads enter into the eye wall threads so cut and afford good and strong holding power of the casing in said eye.

The smooth cylindrical bore of said eye is sufficiently small in diameter that the casing unit, previously entirely assembled, may be freely inserted thereinto until its threads abut the adjacent end surface of said eye, said threads extending radially outwardly beyond said eye wall for substantially the full depth of threading. Thus, there is sufficient length of casing within said eye so that the joint unit is accurately self-centered in the latter, and which insures that when the casing is thereupon rotatably fed through said eye the lead or starter threads will cut true through said eye wall so that the follower threads will accurately fill said threads so cut, and that the opposed faces of the flange 7 of the casing and the adjacent end of said eye will come into true abutment to limit further insertion of the casing into the eye.

I claim:

1. In a ball joint for movably interconnecting a pair of linkage members one of which has an eye therethrough, a cartridge unit removably mountable in said eye and which includes an annular casing bored axially therethrough to receive a stud rotatable and tiltable therein, the exterior of the side wall of said casing being threaded and some of said threads being more ductile than others of them.

2. In a ball joint as set forth in claim 1, but further characterized in that said casing is diametrally smaller at one end than at its other end so that only said smaller end is freely insertible into said eye, and wherein only those threads adjacent said smaller end are of greater hardness than said others of the threads.

3. In a ball joint as set forth in claim 2, but further characterized in that all of the threads are of the same pitch and whereby the harder threads cut complemental threads into the bounding wall of said eye.

4. In a ball joint for movably interconnecting a pair of members one of which has an eye therethrough, a cartridge unit removably insertible through said eye and including an annular casing that is provided with a bore axially therethrough so as to define a concave bearing surface at one end to receive a ball-stud assembly to rotate and tilt on said bearing surface, the exterior of the annular side wall of said casing provided with threads circumferentially thereabout intermediate the ends of the casing, that portion of said casing which has said bearing surface and some of said threads being relatively harder than the remainder of said casing.

5. In a ball-and-socket-joint cartridge unit for interconnecting a pair of relatively movable members one of which has an eye therethrough, an annular shell having an axial bore therethrough with an externally threaded side wall and with a fragmentally spherical end portion converging from said side wall to a reduced diameter end that fits freely through said eye but with the outer diameter of said threads being greater than the diameter of said eye, the threads at the reduced end of said casing being sufficiently harder than the remaining threads to act to cut complemental threads in the bounding wall of said eye, and with said remaining threads being more ductile than the aforesaid threads at said reduced end of the shell so as to serve as follower threads to fit into the threads that have been cut into the wall of said eye by said harder threads.

6. The method of making an externally threaded ferrous hollow casing to receive a stud assembly rotatable and tiltable therein, said shell having one end reduced in diameter and provided with a concave bearing surface interiorly of said casing adjacent said reduced end for bearing engagement with said stud assembly, including the steps of casehardening the entire area of said casing to a predetermined depth of penetration, and then annealing only that portion of said casing that is between said larger end of the casing to a point that is intermediate the length of said threading.

7. The method of making an externally threaded annular ferrous casing for receiving a stud assembly rotatable and tiltable therein, said casing having a diametrally enlarged end and a diametrally reduced end, the casing interior adjacent said reduced end having a concave bearing surface for engagement with said stud assembly, said method including the steps of casehardening the entire surface of said casing to a predetermined depth of penetration, then heating said casing to a progressively decreasing temperature from adjacent said larger end to short of said bearing surface and the threads closest thereto, and whereby said last-mentioned portion of said threads and the bearing surface remain most hardened while the remainder of said casing remains relatively softened from said annealing.

8. The method of making an externally threaded annular ferrous casing for receiving a stud assembly rotatable and tiltable therein, said casing having a diametrally reduced end provided with a concave bearing surface therein and the other end of said casing being provided with a radially outwardly extending flange, said method including the steps of carburizing and casehardening the entire surface of the casing, annealing said casing by applying heat to the larger end of the latter to raise the temperature threat to substantially that of the upper critical temperature of the metal and permitting said heat to travel with progressively decreasing temperature toward said smaller end of the casing to be substantially dissipated at about adjacent the rearmost end of said bearing surface and those threads closest the latter and whereby the metal hardness remains to a greater degree at said last-mentioned portion of the threads and at said bearing surface, and finally removing sufficient surface carburization at the larger end of the casing to leave a peenable annular flange thereat.

References Cited in the file of this patent

UNITED STATES PATENTS

| | | |
|---|---|---|
| 2,254,502 | Thomas et al. | Sept. 2, 1941 |
| 2,645,510 | Booth | July 14, 1953 |

FOREIGN PATENTS

| | | |
|---|---|---|
| 301,309 | Switzerland | Nov. 1, 1954 |